United States Patent [19]

Sumida et al.

[11] Patent Number: 5,111,775

[45] Date of Patent: May 12, 1992

[54] COOLING WATER TEMPERATURE CONTROLLING APPARATUS

[75] Inventors: Mamoru Sumida, Jimeji; Masashi Hashimoto; Osamu Matsumoto, both of Himeji, all of Japan

[73] Assignee: Mitsubishi Denki K.K., Tokyo, Japan

[21] Appl. No.: 622,655

[22] Filed: Dec. 5, 1990

[30] Foreign Application Priority Data

Dec. 6, 1989 [JP] Japan .................................. 1-318429
Dec. 13, 1989 [JP] Japan .................................. 1-324539
Dec. 13, 1989 [JP] Japan .................................. 1-324540
Mar. 7, 1990 [JP] Japan .................................. 2-56838

[51] Int. Cl.⁵ .............................................. F01P 7/14
[52] U.S. Cl. ..................................... 123/41.1; 251/69; 251/305
[58] Field of Search ............. 123/41.08, 41.09, 41.10; 251/129.05, 129.11, 305

[56] References Cited

U.S. PATENT DOCUMENTS

| | | | |
|---|---|---|---|
| 3,442,488 | 5/1969 | Adams | 251/305 |
| 4,007,910 | 2/1977 | Yasuoka et al. | 251/305 |
| 4,113,063 | 9/1978 | Troy | 251/69 |
| 4,381,736 | 5/1983 | Hirayama | 123/41.1 |
| 4,759,224 | 7/1988 | Charbonneau et al. | 137/552 |
| 4,967,778 | 11/1990 | Ball et al. | 251/305 |

FOREIGN PATENT DOCUMENTS 60-20563 5/1985 Japan .

Primary Examiner—Noah P. Kamen
Attorney, Agent, or Firm—Sughrue, Mion, Zinn, Macpeak & Seas

[57] ABSTRACT

A cooling water temperature controlling apparatus for an internal combustion engine comprises a butterfly valve placed in a cooling water passage for the internal combustion engine at a position between the inlet port of a radiator and the inlet port of a radiator bypass pipe, and a stepper motor connected to the butterfly valve through a reduction gear having a worm gear wheel so as to adjust a degree of opening of the butterfly valve depending on the temperature of cooling water.

5 Claims, 10 Drawing Sheets

COOLING WATER TEMPERATURE CONTROLLING APPARATUS

BACKGROUND OF THE INVENTION

1. Field of the Invention

The present invention relates to a cooling water temperature controlling apparatus for an internal combustion engine such as an automobile engine.

2. Discussion of Background

Heretofore, a water cooling type cooling apparatus with use of a radiator has been used to cool an internal combustion engine such as an automobile engine. In such cooling apparatus, a thermostat is used to control the temperature of cooling water in such a manner that when the temperature of the cooling water is lower than a predetermined temperature, the cooling water is fed to a bypass passage so that the cooling water is circulated without passing through the radiator.

Figure 13:
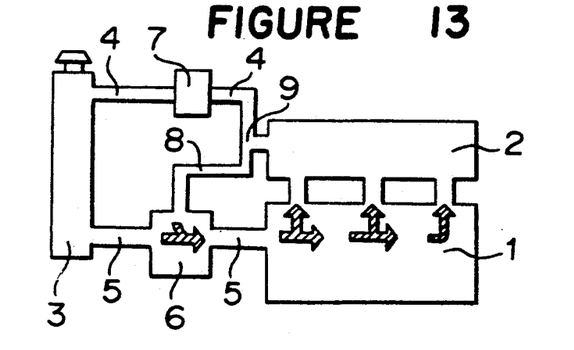
FIG. 13 is a diagram showing a conventional cooling apparatus.

FIG. 13 is a diagram showing a conventional cooling apparatus. In FIG. 13, a reference numeral 1 designates a cooling water passage formed in a cylinder block for an internal combustion engine, a numeral 2 designates a cooling water passage formed in a cylinder head, which is communicated with the cooling water passage 1 of the cylinder block, and a numeral 3 designates a radiator. The inlet port for cooling water of the radiator 3 is communicated with the cooling water passage 2 of the cylinder head through a radiator inlet passage 4. The outlet port of the radiator 3 is communicated with the cooling water passage 1 of the cylinder block through a radiator outlet passage 5. A numeral 6 designates a cooling water pump placed in the radiator outlet passage 5. A numeral 7 designates a thermostat to control the flow rate of the cooling water supplied to the radiator 3 in correspondence to the temperature of the cooling water, the thermostat 7 being disposed in the radiator inlet passage 4. Further, the thermostat 7 is so constructed as to be entirely closed when the temperature of the cooling water is a predetermined temperature (generally, 80° C.) or lower. A numeral 8 designates a bypass passage for circulating the cooling water by bypassing the radiator when the temperature of the cooling water is lower than a predetermined value, and an end of the bypass passage 8 is connected to the radiator inlet passage 4 at the upstream side of the thermostat 7 by means of a branch portion 9 while the other end is connected to the cooling water pump 6.

The conventional cooling apparatus having the above-mentioned construction operates as follows. When the temperature of the cooling water is relatively low as in a case, for instance, the immediately after of the starting of the engine, the cooling water supplied to the cooling water passage 1 of the cylinder block by means of the cooling water pump 6 is fed from the cooling water passage 2 of the cylinder head to the branch portion 9. At this moment, since the thermostat 7 is entirely closed, the cooling water is not fed to the radiator 3 but is returned to the cooling water pump 6 through the bypass passage 8. Thus, when the temperature of the cooling water is low, the cooling water is circulated without performing a cooling function. When the temperature of the cooling water rises over a set temperature which is determined by the thermostat 7, the thermostat 7 is opened, and the cooling water is fed from the cooling water passage 2 of the cylinder head through the cooling water branch portion 9 and the radiator inlet passage 4 to the radiator 3. Then, the cooling water cooled in the radiator 3 is returned to the cooling water pump 6 through the radiator outlet passage 5 and is again supplied to the cooling water passage 1 of the cylinder block. Thus, the engine is cooled by feeding the cooling water cooled in the radiator 3 to the engine.

In the conventional cooling apparatus, however, the temperature of the cooling water was maintained at a substantially constant temperature (generally, 80° C.) in winter and summer seasons since the temperature was controlled to have a set temperature by the thermostat 7. Accordingly, it was difficult to optimally control the temperature of the cooling water depending on operational conditions of the engine and an outer temperature. For instance, when the temperature of the cooling water is set to have a higher value in view of the performance of a heater and in order to save fuel, the temperature of the cooling water tends to become a higher value in a summer season, whereby a cooling effect to the engine may reduce or the temperature of lubricating oil may increase.

Furthermore, there was a limit in increasing the flow rate of the cooling water since a large pressure loss is resulted when the use of the thermostat is used to control the flow rate of the cooling water. In order to eliminate the above-mentioned disadvantage, there was proposed a cooling water temperature controlling apparatus for an internal combustion engine as disclosed in Japanese Examined Patent Publication Sho 60-20563. In the cooling water temperature controlling apparatus as in the publication, a cooling water passage comprising a first cooling water passage in which a thermostat operable at a high temperature is disposed and a second cooling water passage in which a thermostat operable at a low temperature is disposed, which are parallel to each other, wherein a flow rate controlling valve is disposed in one of the cooling water passages. Although use of the two thermostats allowed to provide various conditions for a set temperature in order to control the temperature of the cooling water, such structure occupied a much space in the engine because of the parallel arrangement of the cooling water passages, and the flow rate controlling valve was needed, whereby it was contrary to the requirements of reducing the size of the cooling water temperature controlling apparatus. Further, in the conventional controlling apparatus, the two thermostats having a large pressure loss are disposed in the cooling water passages, whereby efficiency for supplying a large flow rate was low.

Since the conventional cooling water temperature controlling apparatus as shown in FIG. 13 has a pipe joint and a hose of rubber at the cooling water branch portion 9, work at the time of assembling or inspecting is troublesome because the hose of rubber has to be attached or detached. Further, in the cooling apparatus as shown in FIG. 13, it is difficult to feed entirely the cooling water to the radiator 3 even when the temperature of the cooling water rises beyond a set temperature and the thermostat 7 is entirely opened, because a part of the cooling water flows in the bypass passage 8. Accordingly, efficiency of cooling in the cooling apparatus is low from the viewpoint of the entire cooling system.

SUMMARY OF THE INVENTION

It is an object of the present invention to provide a cooling water temperature controlling apparatus for an internal combustion engine capable of controlling the flow rate of cooling water to be supplied to the radiator depending on the temperature of the cooling water, by adjusting the degree of opening of a butterfly valve to a predetermined valve by means of a stepper motor.

According to the present invention, there is provided a cooling water temperature controlling apparatus for an internal combustion engine which comprises a butterfly valve placed in a cooling water passage for the internal combustion engine at a position between the inlet port of a radiator and the inlet port of a radiator bypass pipe, and a stepper motor connected to the butterfly valve through a reduction gear having a worm gear wheel so as to adjust a degree of opening of the butterfly valve depending on the temperature of cooling water.

According to the present invention, there is provided a cooling water temperature controlling apparatus for an internal combustion engine which comprises a main body having a main cooling water passage and a bypass cooling water passage branched from the main cooling water passage, a butterfly valve for regulating a flow rate of cooling water which is to open and close the main cooling water passage, and a stepper motor connected to the butterfly valve through a reduction gear having a worm gear wheel, wherein the branch portion for branching the bypass cooling water passage from the main cooling water passage is formed at the upstream side of the butterfly valve.

According to the present invention, there is provided a cooling water temperature controlling apparatus for an internal combustion engine which comprises a main body having a main cooling water passage and a bypass cooling water passage branched from the main cooling water passage, a butterfly valve having a valve rod which is rotatably supported by the main body and extends in the main cooling water passage and the bypass cooling water passage at the downstream side of the branch portion of the both passages, said butterfly valve having two valve bodies attached to the valve rod in said both cooling passages wherein the angle of one valve body is perpendicular to the angle of the other valve body in the direction of opening or closing, and a stepper motor connected through a reduction gear having a worm gear wheel to the butterfly valve at a side of the main body, wherein the valve rod is on one hand supported at the side of the reduction gear by two ball bearings which are disposed at both sides of the connecting portion of the reduction gear, and the valve rod is on the other hand supported at the side of the bypass cooling water passage by a sleeve bearing which has a greater gap to the valve rod than the gap of the ball bearing to the valve rod.

According to the present invention, there is provided a cooling water temperature controlling apparatus for an internal combustion engine which comprises a butterfly valve placed in a cooling water passage for the internal combustion engine at position between the inlet port of a radiator and the inlet port of a radiator bypass pipe, and a stepper motor connected to the butterfly valve through a reduction gear having a worm gear wheel so as to adjust a degree of opening of the butterfly valve depending on the temperature of cooling water, wherein the valve rod of the butterfly valve is eccentrically provided in the radially outer direction with respect to the center of rotation of the valve body.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIGS. 1a-1d are respectively diagrams showing a first embodiment of the cooling water temperature controlling apparatus for an internal combustion engine according to the present invention wherein FIG. 1d is a cross-sectional view taken along a line I—I in FIG. 1a;

FIGS. 3a and 3b are respectively diagrams showing a second embodiment of the cooling water temperature controlling apparatus according to the present invention, wherein

FIGS. 4a-4d are respectively diagrams showing a third embodiment of the cooling water temperature controlling apparatus for an internal combustion engine according to the present invention, wherein FIG. 4d is a cross-sectional view taken along a line I—I in FIG. 4a;

FIGS. 6a-6c are respectively diagrams showing a fourth embodiment of the cooling water temperature controlling apparatus according to the present invention, wherein FIG. 6c is a cross-sectional view taken along a III—III in FIG. 6a;

FIGS. 7a-7d are respectively diagrams showing a fifth embodiment of the cooling water temperature controlling apparatus according to the present invention, wherein FIG. 7d is a cross-sectional view taken along a line I—I in FIG. 7a;

FIG. 10 is a cross-sectional view taken along a line II—II in FIG. 9a;

FIG. 11 is an enlarged cross-sectional view of the controlling apparatus according to the sixth embodiment of the present invention in which a relation of a valve shaft having butterfly valve to a valve body is shown;

DETAILED DESCRIPTION OF PREFERRED EMBODIMENTS

In the drawings, wherein the same reference numerals designate the same or corresponding parts throughout the several views, and more particularly to FIGS. 1a–1d and FIG. 2 thereof, there is shown a first embodiment of the cooling water temperature controlling apparatus for an internal combustion engine of the present invention.

Figure 1A:
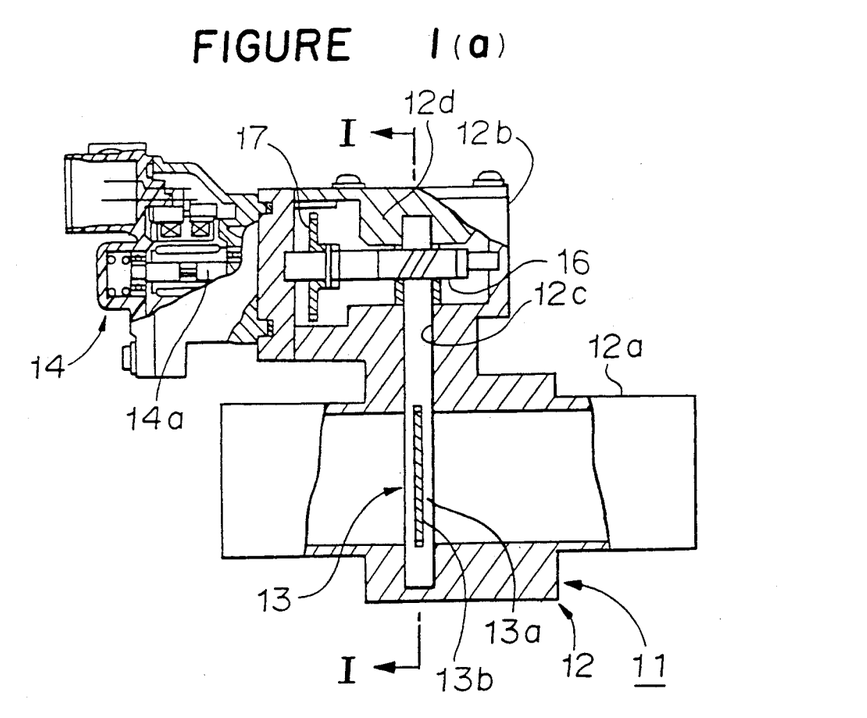
FIG. 1a is a front view partly broken.
Figure 1B:
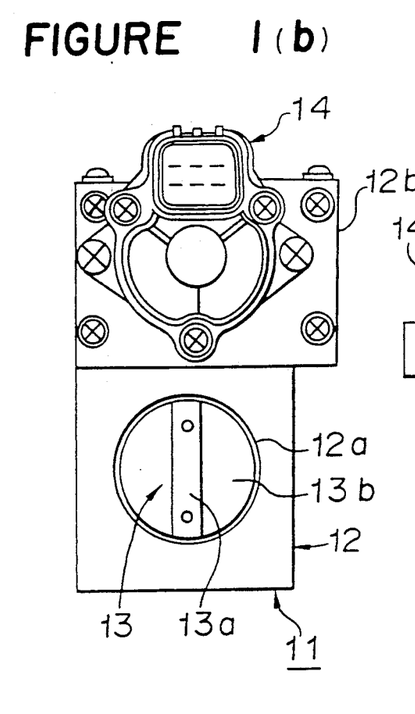
FIG. 1b is a left side view, FIG. 1c a plane view in which a cover for a gear box is removed.
Figure 1C:
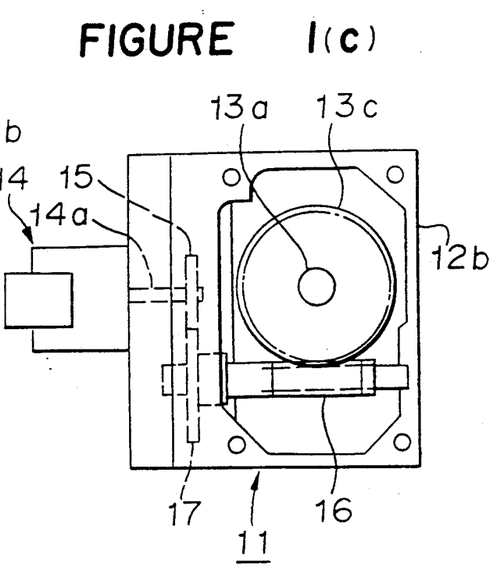
Figure 1D:
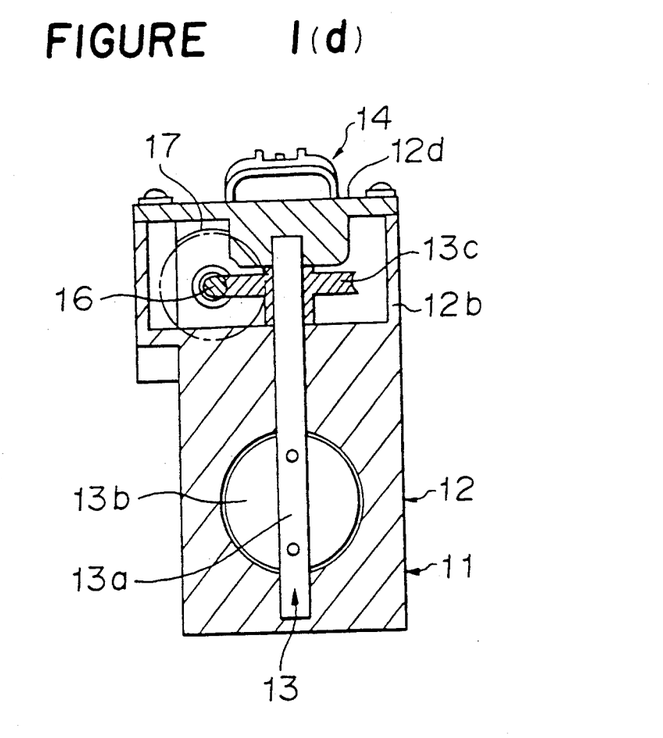
Figure 2:
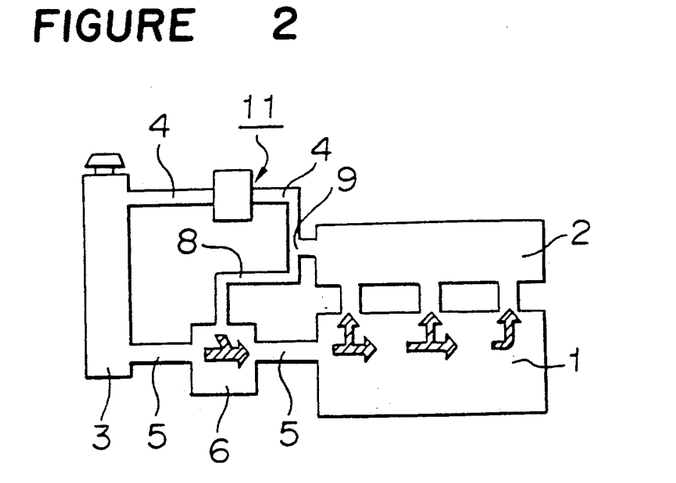
FIG. 2 is a diagram showing a cooling apparatus in which the cooling water temperature controlling apparatus of the first embodiment of the present invention i provided.

In FIGS. 1 and 2, a reference numeral 11 designates a cooling water temperature controlling apparatus which comprises a main body 12, a butterfly valve 13, a stepper motor 14 and so on.

The main body 12 comprises a tubular portion 12a which is connectable to the radiator inlet passage 4 of a cooling apparatus so as to flow the cooling water, and gear box 12b which is formed integrally with the tubular portion 12a and has a generally rectangular hollow body with a bottom. In the tubular portion 12a and the gear box 12b, an axial hole 12c in which the butterfly valve 13 is inserted, is formed.

The butterfly valve 13 is to control the flow rate of the cooling water flowing in the tubular portion 12a, and it comprises a valve shaft 13a which is inserted in the axial hole 12c in the main body 12 so as to traverse the tubular portion 12a and a valve body 13b fixed to the valve shaft 13a, the valve shaft being rotatable in the tubular portion 12a. The valve shaft 13a is rotatably supported in and by the main body 13. An end portion of the valve shaft 13a is pivoted by a cover 12d which is attached to the gear box 12b which contains a worm wheel 13c.

A numeral 14 designates a stepper motor to open and close the butterfly valve 13. The stepper motor 14 is electrically connected through lines to a sensor (not shown) which detects the temperature of the cooling water and a control device (not shown) so that the stepper motor is driven depending on the temperature of the cooling water. The stepper motor 14 is attached to a side of the gear box 12b.

The output shaft 14a of the stepper motor 14 has an end passes through a side wall of the gear box 12 and extends in it, and the end of the output shaft 14a is attached with a spur gear 15 placed at the side of the stepper motor (hereinafter, referred to as a stepper motor side spur gear).

A numeral 16 designates a worm to transmit a driving force from the stepper motor 14 to the butterfly valve 13. The worm 16 has an end to which a spur gear 17 is fixed so as to engage with the stepper motor side spur gear 15. Further, the worm 16 is rotatably supported in the gear box 12 in a state that it is engaged with the worm wheel 13c fixed to the butterfly valve 13. Namely, a reduction gear is constituted by the worm 16 and the worm wheel 13c. When the stepper motor 14 is driven and the stepper motor side spur gear 15 is rotated along with output shaft 14a of the motor 14, the worm 16 is rotated with the spur gear 17, whereby the worm wheel 13 engaged with the worm 16 is rotated in a reduced speed, and the butterfly valve 13 is driven.

The cooling water temperature controlling apparatus 11 having the above-mentioned construction is used by connecting the tubular portion 12a of the main body 12 with the radiator inlet passage 4. Either end of the opening ends of the tubular portion 12a may be used for the inlet for the cooling water.

When the temperature of the cooling water is higher than a predetermined value, the butterfly valve 13 is opened by the operation of the stepper motor 14 which receives an instruction from the control device. In this case, the driving force of the stepper motor 14, is transmitted from the output shaft 14a through the stepper motor side spur gear 15 and the spur gear 17 to the worm 16, and the driving force is further transmitted from the worm 16 through the worm wheel 13c to the butterfly valve 13. Thus, the opening movement of the butterfly valve 13 allows the cooling water to flow to the radiator 3 through the radiator inlet passage 4 so that the cooling water is cooled.

When the temperature of the cooling water is lower than the predetermined value, the stepper motor 14 is driven by an instruction from the control device so that the butterfly valve 13 is closed. Thus, the cooling water is prohibited from flowing to the radiator 3 and is fed to the radiator outlet passage 5 through the bypass passage 8.

The cooling water temperature controlling apparatus of the present invention can control the flow rate of the cooling water at a desired set temperature depending on various conditions of the engine, in addition that it performs function as a thermostat by closing or opening the butterfly valve 13. Further, it can control the flow rate by determining the degree of opening of the butterfly valve 13. For instance, when an outer temperature is relatively low, the temperature of the cooling water can be increased by maintaining the degree of opening of the butterfly valve at an intermediate position and by slightly throttling the radiator inlet passage 4. On the other hand, when the outer temperature is relatively high, e.g. in a summer season, the temperature of the cooling water can be maintained at a low level by entirely opening the butterfly valve 13.

Thus, the cooling water temperature controlling apparatus 11 of the present invention can control the flow rate of the cooling water to be fed to the radiator 3 depending on the temperature of the cooling water by controlling the butterfly valve 13 to a predetermined degree of opening by means of the stepper motor 14. Thus, the temperature of the cooling water can be maintained at the optimum temperature.

In the next, a second embodiment of the cooling water temperature controlling apparatus of the present invention will be described with reference to FIGS. 3a and 3b wherein the same reference numerals as in FIGS. 1 and 2 designate the same or corresponding parts, and therefore, description of these parts is omitted.

Figure 3A:
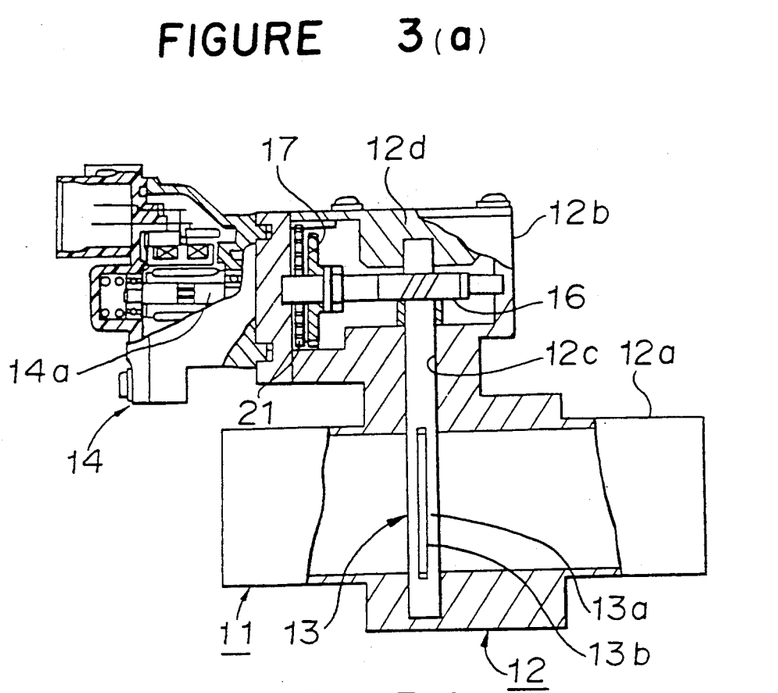
FIG. 3a is a front view partly broken and FIG. 3b is a plane view in which a cover for a gear box is removed.
Figure 3B:
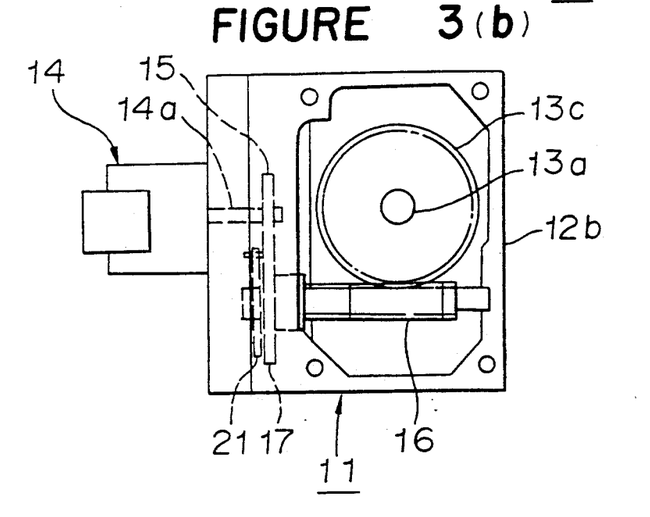
Figure 4A:
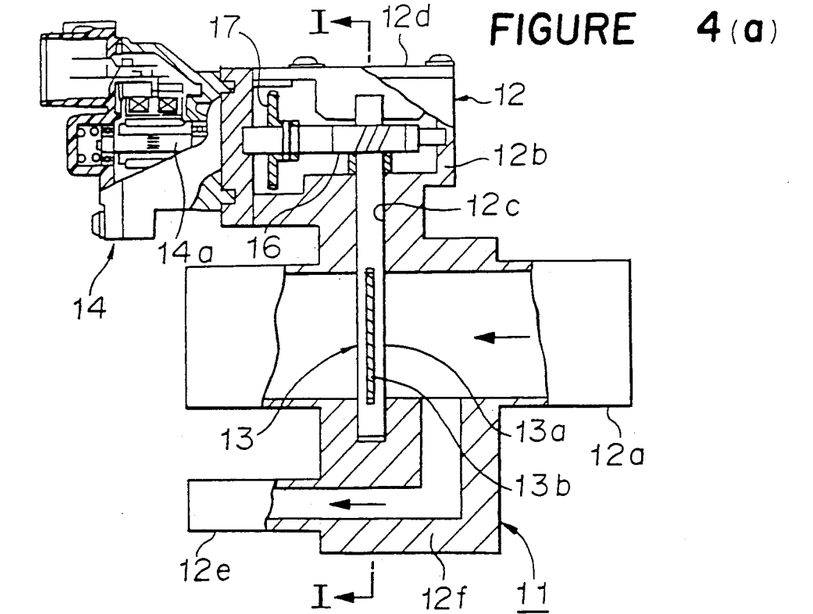
FIG. 4a is a front view partly broken.
Figure 4B:
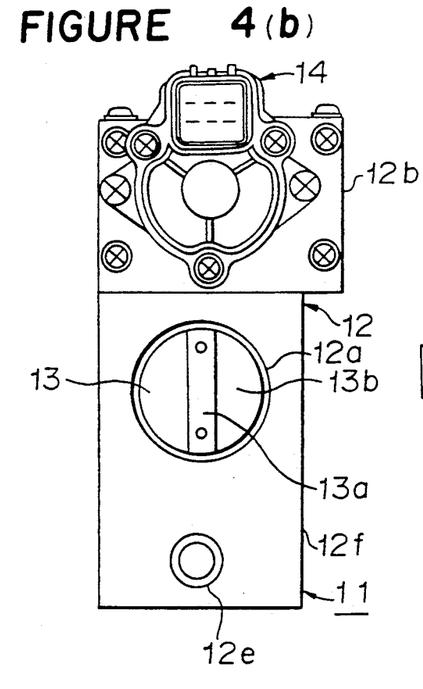
FIG. 4b is a left side view.
Figure 4C:
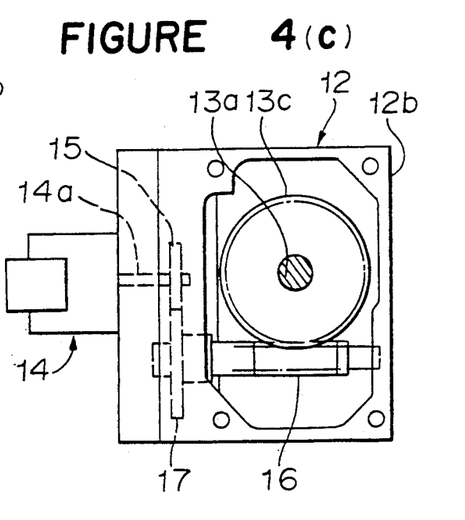
FIG. 4c is a plane view in which a cover for a gear box is removed.
Figure 4D:
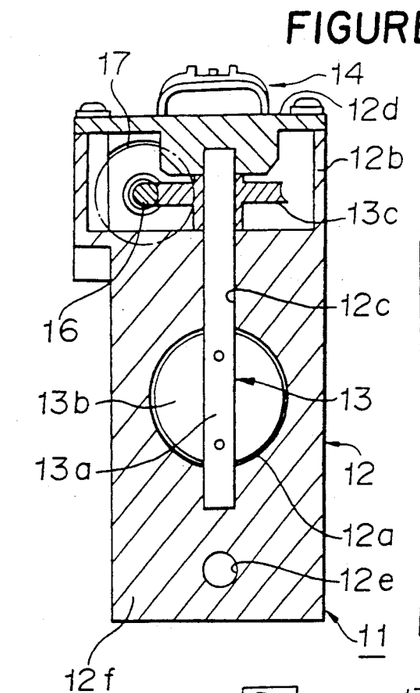

In FIGS. 3a and 3b, a reference numeral 21 designates a return spring adapted to compensate a flow of cooling water in a case that the stepper motor 14 becomes faulty or an electric current interruption takes place during the operation of the apparatus. The return spring 21 is in a spiral form wherein the end at the center side is fixed to the worm 16 at a position near the stepper motor while the outermost end is fixed to the gear box 12b so that the returning direction coincides with the direction of rotation of the worm 16 to open the butterfly valve under an restricted condition. Namely, the butterfly valve 13 is always forced in the opening direction by means of the return spring 21. Further, a torque given by the return spring is so determined as to be sufficient to allow the butterfly valve to be opened by overcoming a detent torque at a non-conductive condition of the stepper motor 14.

In the cooling water temperature controlling apparatus 11 provided with the return spring 21, the butterfly valve 13 tends to be returned against the spring action of the return spring 21 in normal use. However, when a current from a power source for the stepper motor 14 is interrupted or the stepper motor 14 itself becomes faulty, the worm 16 is turned by the returning torque of the return spring 21 so that the butterfly valve 13 is entirely opened.

In the above-mentioned embodiment, description is made as to a case that the return spring 21 is resiliently interposed between the worm 16 at a position near the stepper motor and the gear box 12b. However, the returning torque of the return spring 21 may be applied to the other end portion of the worm 16, or may be to the stepper motor 14 itself, or the output shaft 14a of the stepper motor 14, or the stepper motor side spur gear 15. Such modification may be made as desired. Further, in the above-mentioned embodiment, use of a spirally wound return spring 21 is exemplified. However the return spring 21 is of, for instance, a coil spring, but it is not limited thereto.

The advantages of the cooling water temperature controlling apparatus according to the first and second embodiments of the present invention are as follows.

The flow rate of the cooling water to be fed to the radiator can be controlled depending on the temperature of the cooling water by controlling the degree of opening of the butterfly valve by means of the stepper motor. Accordingly, the temperature of the cooling water can be maintained at the optimum value regardless of an outer temperature. It is possible to improve the performance of the heater and to save fuel by controlling the temperature of the cooling water to be a higher value in a winter season, while reduction in cooling effect in the engine and rise in temperature of lubricating oil can be certainly prevented by controlling the temperature of the cooling water to be a lower value in a summer season.

Since the cooling water temperature controlling apparatus of the present invention can be formed in a single control valve, the cooling water feeding system can be small-sized.

Further, use of the butterfly valve to control the flow rate of the cooling water reduces a pressure loss in the cooling water passage because the factor of causing the pressure loss is limited only to the projection given by the thickness of the valve rod and the valve body. The cooling water smoothly flows without a rapid change in a flowing direction in the same manner as using a thermostat. Accordingly, a pressure loss in the cooling water passage can be greatly reduced, whereby a large flow rate of cooling water is obtainable.

Further, since the cooling water temperature controlling apparatus is provided with the reduction gear having a worm gear, a large speed reducing ratio can be obtained while the size of the apparatus is small. The controlling apparatus of the present invention can certainly avoid the inoperable state of the butterfly valve due to the pressure of the cooling water even though the size of the apparatus is not so large. In addition, use of the worm gear prevents the butterfly valve from reverse rotation by the pressure of the cooling water when the butterfly valve is maintained at an intermediate degree of opening by the stepper motor.

Specifically, in the second embodiment of the cooling water temperature controlling apparatus, since the spring member is connected to the driving part of the butterfly valve so as to force the valve body in the opening direction, the butterfly valve is entirely opened because of the returning torque of the spring member in a case that an electric current from a power source for the stepper motor is interrupted or the stepper motor becomes faulty. Accordingly, even when the stepper motor becomes inoperable during the butterfly valve being in a closing state, an undesired result that the butterfly valve prevents the cooling water from flowing to the radiator and the engine and the lubricating oil are not cooled, can be certainly prevented to thereby increase reliability.

A third embodiment of of the present invention will be described with reference to FIGS. 4a-4d and FIG. 5, wherein the same reference numerals as in FIGS. 1-3 designate the same or corresponding parts, and therefore, description of these parts is omitted.

The main body 12 of the cooling water temperature controlling apparatus 11 comprises a tubular portion 12f in which a main cooling water passage 12a connectable to the radiator inlet passage 4 of the cooling apparatus and a bypass cooling water passage 12e which is branched from the main cooling water passage 12a in the main body 12 and which is connectable to the bypass passage 8 are formed, and a gear box 12b which is formed integrally with the tubular portion 12f and has a substantially rectangular hollow body with a bottom. An axial hole 12c is formed passing through the tubular portion 12f and the gear box 12d at the downstream side of the branch portion which branches the bypass cooling water passage 12b from the main cooling water passage 12a. The axial hole 12c is to receive therein the valve rod of the butterfly valve 12.

Figure 5:
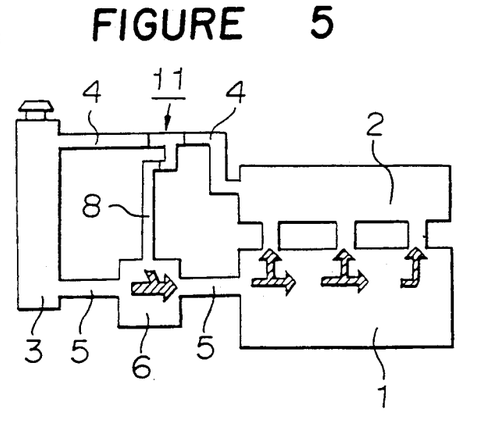
FIG. 5 is a diagram showing a cooling apparatus in which the cooling water temperature controlling apparatus of the second embodiment of the present invention is provided.

The cooling water temperature controlling apparatus 11 is used by connecting the main cooling water passage 12a to the radiator inlet passage 4 and by connecting the bypass cooling water passage 12e to the bypass passage 8 as shown in FIG. 5, the cooling water temperature controlling apparatus 11 being used instead of the conventional thermostat. In connecting the passages, the direction of the main body 12 is determined so that the branch portion of the bypass cooling water passage 12e to the main cooling water passage 12a is positioned at the upstream side of the butterfly valve 13.

The operation of the third embodiment will be described. When the temperature of the cooling water is higher than a set value, the same function and effect as the first and second embodiments can be attained.

When the temperature of the cooling water is lower than the set temperature, the butterfly valve 13 is closed by means of the stepper motor 14 which receives an instruction from the control device. Upon closing the butterfly valve 13, the cooling water is prohibited from flowing to the radiator 3 and is fed to the radiator outlet passage 5 through the bypass cooling water passage 12e of the main body 12 and the bypass passage 8.

In accordance with the third embodiment of the present invention, the same advantages as those in the first and second embodiments can be obtained. In addition, the main body 12 of the cooling water temperature controlling apparatus may be a branching joint. Accordingly, a conventionally used branching joint is unnecessary.

A fourth embodiment of the cooling water temperature controlling apparatus of the present invention will be described with reference to FIGS. 6a-6c.

Figure 6A:
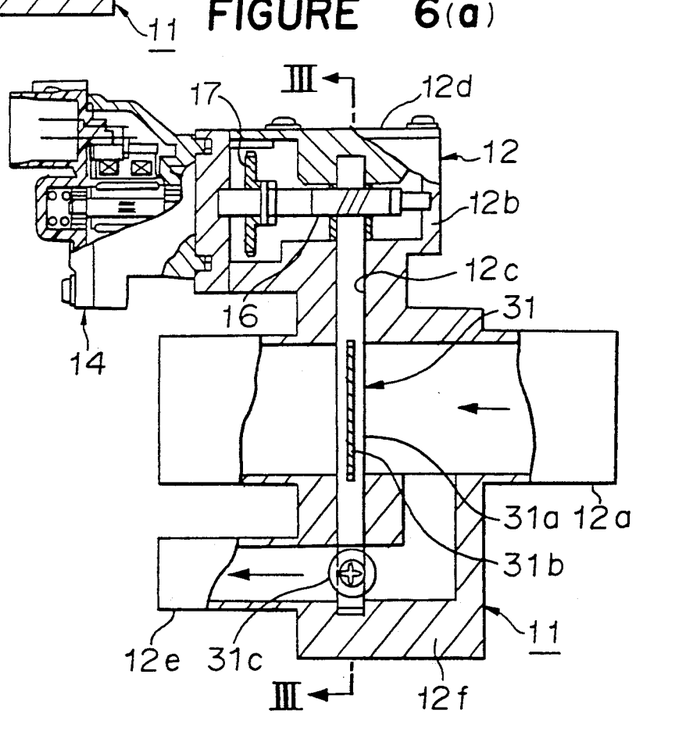
FIG. 6a is a front view partly broken.
Figure 6B:
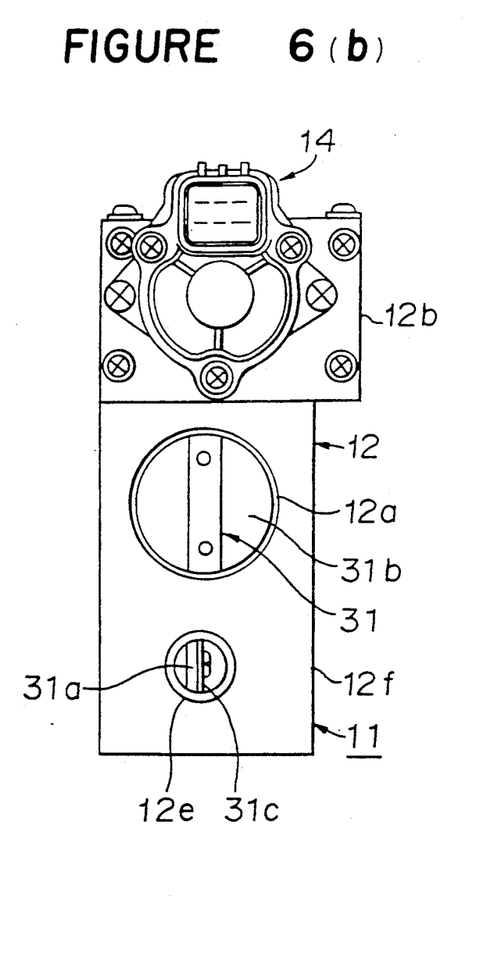
FIG. 6b is a left side view.
Figure 6C:
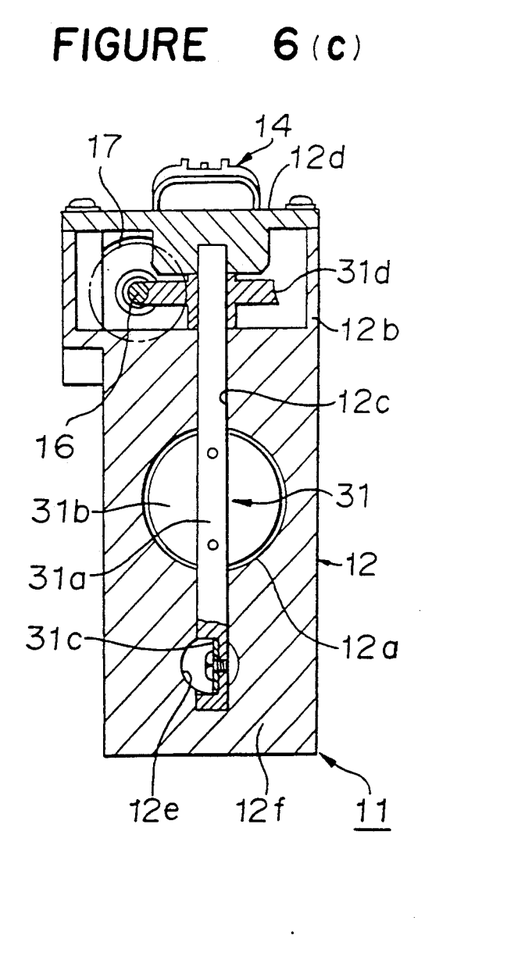

In FIGS. 6a-6c, a reference numeral 31 designates a butterfly valve which controls the flow rate of cooling water flowing in a main cooling water passage 12a and a bypass cooling water passage 12e formed in the main body 12. The butterfly valve 31 is tunably held by and in the main body 12 and comprises a valve shaft 31a inserted in an axial hole formed in the main body 12 and traversing the main cooling water passage 12a and the bypass cooling water passage 12e, a valve body 31b fixed to the valve shaft 31 so as to be located in the main cooling water passage 12a (hereinbelow, referred to as a main cooling water passage side valve body 31b) and a valve body 31c fixed to the valve shaft 31a so as to be located in the bypass cooling water passage 12b (hereinbelow, referred to as a bypass cooling water passage side valve body 31c). An end of the valve shaft 31a extending toward the gear box 12b is pivotally supported by a cover 12d which is fixed to the gear box 12b. A worm 16 is fixed to the valve shaft 31a in the gear box 12b so as to be interlocked with a worm wheel 31d which is, in turn, firmly connected to the output shaft of a stepper motor 14.

The bypass cooling water passage side valve body 31c is fixed to the valve shaft 31a at an angle perpendicular to the angle of the main cooling water passage side valve body 31b in the direction of opening and closing of the butterfly valve 31. Namely, the bypass cooling water passage side vale body 31c is opened or closed depending on the movement of opening or closing of the main cooling water passage side valve body 31b. Accordingly, when the main cooling water passage side valve valve body 31b is entirely opened, the bypass cooling water passage side valve body 31c is entirely closed.

In the cooling water temperature controlling apparatus provided with the bypass cooling water passage side valve body 31c as described above, when the temperature of the cooling water becomes higher than a predetermined temperature value and the butterfly valve 31 is moved to opening, the main cooling water passage side valve body 31b is opened while the bypass cooling water passage side valve body 31c is closed. When the main cooling water passage side valve body 31b is entirely opened and the bypass cooling water passage side valve body 31c is entirely closed, the cooling water is prohibited from flowing to the bypass cooling water passage 12e in the main body 12 but is fed to the radiator 3 through the main cooling water passage 12a only.

When the temperature of the cooling water is lower than a predetermined temperature value, the butterfly valve is moved wherein the main cooling water passage side valve body 31b is entirely closed while the bypass cooling water passage side valve body 31c is entirely opened. In this state, the cooling water is not fed to the main cooling water passage 12a but it is fed to the radiator outlet passage 5 via the bypass cooling water passage 12e and the bypass passage 8. Thus, an appropriate amount of the cooling water is circulated while the temperature of the cooling water is increased. Accordingly, by providing the bypass cooling water passage side valve body 31c, the cooling water is prohibited from flowing to the bypass cooling water passage 12e when the temperature of the cooling water becomes higher than the set temperature, whereby the cooling water is entirely fed to the radiator 3.

In the third embodiment of the present invention, description is made as to a case that the main cooling water passage side valve body 31b and the bypass cooling water passage side valve body 31c are attached to the same valve shaft 31a. However, the present invention is not limited to this case but a different structure may be used. For instance, the main cooling water passage 12a and the bypass cooling water passage 12e respectively have butterfly valves having their own valve shafts and the both butterfly valves have a relation in an angular phase difference of 90° C. so as to obtain the same function and effect.

In the fourth embodiment of the present invention, the same effect as the first embodiment can be obtained.

A fifth embodiment of the cooling water temperature controlling apparatus for an internal combustion engine of the present invention will be described with reference to FIGS. 7a-7d and FIG. 8.

In FIGS. 7a-7d and FIG. 8, a reference numeral 111 designates a cooling water temperature controlling apparatus which comprises the main body 112, a tubular portion 113 attached to the main body 112, a butterfly valve 114 rotatably supported in the main body 112 and a stepper motor 115 for driving the butterfly valve 114.

The main body 112 has a first opening portion 112a which constitutes a part of a main cooling water passage, a flange portion 112c having a second opening portion 112b constituting a part of bypass cooling water passage and supporting a tubular portion 113 (which will be described below) and a gear box 112d which is formed integrally with the flange portion 112c and which is in a generally rectangular hollow body with a bottom. In the flange portion 112c, there is formed an axial hole 112e in which a butterfly valve (which will be described below) is inserted and which extends from the gear box 112d to the end portion opposite the gear box 112d by traversing the first opening portion 112a and the second opening portion 112b. The inner diameter of the axial hole 112e at a portion A between the gear box 112d and the first opening portion 112a is formed slightly thinner than the other portion, namely, the portion B of the axial hole 112e between the first opening portion 112a and the second opening portion 112b and the portion C of the axial hole which is opposite the gear box 112d with respect to the second opening portion 112b.

The tubular portion 113 is connected to the main body 112 and forms a cooling water passage. The tubular portion 113 comprises a flange portion for branching 113a (hereinbelow referred to as a first flange portion) which is connected to the radiator inlet passage 4 of the cooling apparatus, a flange portion 113b at the main cooling water passage side (hereinbelow referred to as a second flange portion) and a flange portion 113c at the bypass cooling water passage side (hereinbelow, referred to as a third flange portion) which is connected to the bypass passage 8 of the cooling apparatus. The first flange portion 113a has a first cooling water passage 113d which corresponds to the first opening portion 112a of the main body 112 and a bypass cooling water passage 113e which corresponds to the second opening portion 112b of the main body 112. The positional relation of these flange portions is such that the first flange portion 113a is arranged at one side of the flange portion 112c and the second flange portion 113b and the third flange portion 113c are arranged at the other side while the flange portion 112c is interposed therebetween, an assembly of these flange portions being fixed to the main body 112. Namely, by attaching the tubular portion 113 to the main body 112, the first opening portion 112a is communicatively connected to the main cooling water passage 113d and the second opening portion 112b is communicatively connected to the bypass cooling water passage 113e.

The butterfly valve 114 is to control the flow rate of cooling water flowing in the main cooling water passage 113d and the bypass cooling water passage 113e. The butterfly valve 114 comprises a valve shaft 114a which is inserted in the axial hole 112e formed in the main body 112 and traverses the first opening portion 112a and the second opening portion 112b, a main cooling water passage side valve body 114b fixed to the valve shaft 114a at a position facing the first opening portion 112a, a bypass cooling water passage side valve body 114c fixed to the valve shaft 114a at the portion facing the second opening portion 112b, and a worm wheel 114d fixed to the valve shaft 114a at a portion in the gear box 112d.

Figure 7A:
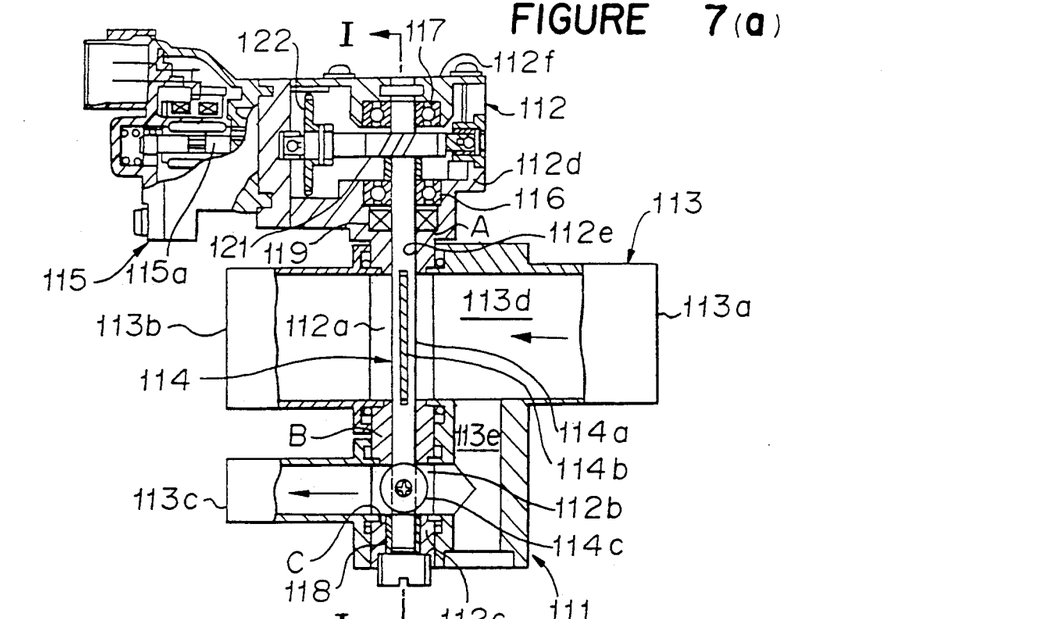
FIG. 7a is a front view partly broken.
Figure 7B:
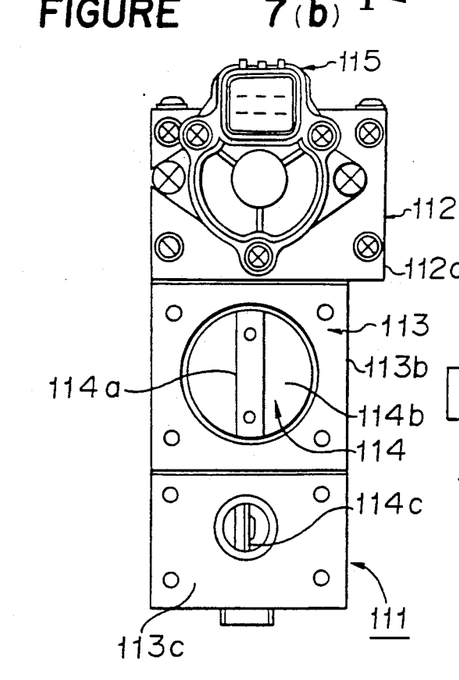
FIG. 7b is a left side view.
Figure 7C:
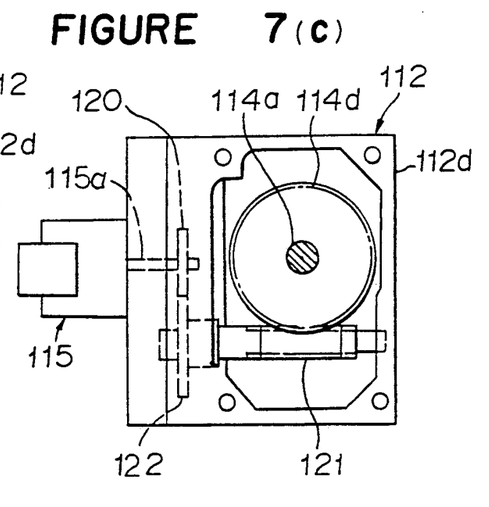
FIG. 7c is a plane view in which a cover for a gear box is removed.
Figure 7D:
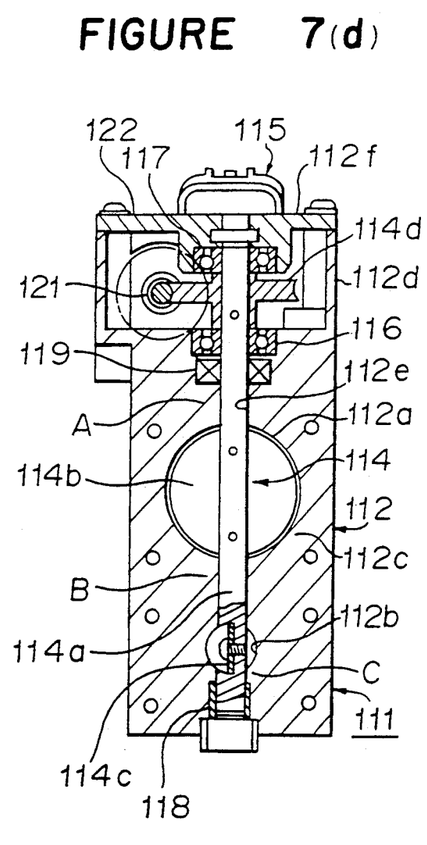

The valve shaft 114a has an end portion extending to the gear box 112d, which is rotatably supported by the main body 112 by means of two ball bearings 116, 117 disposed at both sides of the worm wheel 114d, and the other end portion supported by the flange portion 112c by means of a sleeve bearing 118. One bearing 116 between the two ball bearings 116, 117 is fitted to the gear box 112d and the other 117 is fitted to a cover 112f which is fixed to the gear box 112d. In this embodiment the sleeve bearing 118 used is such that the gap between the inner diameter of the sleeve bearing 118 and the outer diameter of the valve shaft 114a is larger than the gap between the inner diameters of the ball bearings 116, 117 and the outer diameter of the valve shaft 114a. In order to make the gap between the valve shaft 114a and the sleeve bearing 118 larger than those of the ball bearing 116, 117 to the valve shaft 114a, a sleeve bearing 118 having a large inner diameter may be used, or a valve shaft 114a having a diameter at the portion corresponding to the sleeve bearing 118, which is thinner than the other portion, may be used.

A reference numeral 119 designates a sealing member which prevents the cooling water from entering in the gear box 112d through the gap formed at the axial hole 112e, and prevents lubricating oil in the gear box 112d from leaking to the cooling water passage side. The sealing member 119 is provided in the base portion of the gear box 112d and near the first opening portion 112a with respect to the ball bearing 116.

The bypass cooling water passage side valve body 114c is attached to the valve shaft 114a in such a relation that the relative angle between the bypass cooling water passage side valve body 114c is perpendicular to the main cooling water passage side valve body 114b in the direction of opening and closing the butterfly valve. Namely, the bypass cooling water passage side valve body 114c is opened or closed depending on the movement of opening or closing the main cooling water passage side valve body 114b. For instance, when the main cooling water passage side valve body 114b is entirely opened, the bypass cooling water passage side valve body 114c is entirely closed.

The stepper motor 115 is so constructed that it is electrically connected to a sensor (not shown) for detecting the temperature of the cooling water and a control device (not shown), whereby it is actuated depending on the temperature of the cooling water. The stepper motor 115 is attached to a side of the gear box 112d. The free end of the output shaft 115a of the stepper motor 115 passes through the side wall of the gear box 112d and extends in the gear box 112d, the free end being fixed with a stepper motor side spur gear 120 as shown in FIG. 7c.

A numeral 121 designates a worm adapted to transmit the driving force of the stepper motor 115 to the butterfly valve 114. The worm 121 has an end to which a spur gear 122 is fixed so as to be interlocked with the stepper motor side spur gear 120. The worm 121 is further interlocked with the worm wheel 114d which is fixed to the butterfly valve 114 and the worm 121 is rotatably supported in and by the gear box 112d. Namely, a reduction gear is constituted by the worm 121 and the worm wheel 114d. When the stepper motor 115 is actuated and the stepper motor side spur gear 120 is rotated along with the output shaft 115a, the worm 121 is rotated with the spur gear 122 whereby the worm wheel 114d interlocked with the worm 121 is rotated at a reduced speed to thereby drive the butterfly valve 114.

Figure 8:
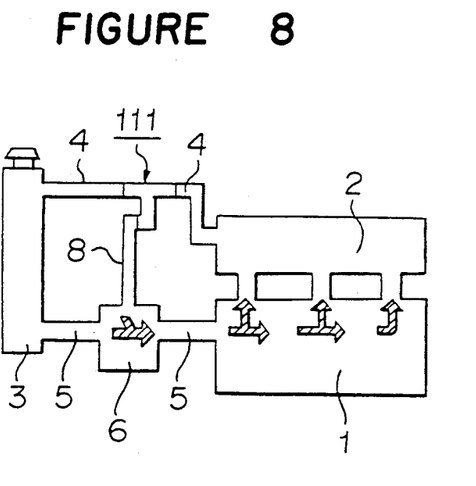
FIG. 8 is a diagram showing a cooling apparatus in which the cooling water temperature controlling apparatus of the fifth embodiment of the present invention is provided.

The cooling water temperature controlling apparatus 111 having the above-mentioned construction is connected to the cooling apparatus by connecting the first branch portion 113a and the second branch portion 113b to the radiator inlet passage 4 instead of a conventional thermostat, and by connecting the third flange portion 113c to the bypass passage 8. In connecting the controlling apparatus to the cooling apparatus, the orientation of the main body 112 should be so determined that the first flange portion 113a is positioned at the upstream side.

The operation of the cooling water temperature controlling apparatus according to the fifth embodiment of the present invention will be described.

When the temperature of the cooling water is higher than a set temperature, the stepper motor 115 is actuated by an instruction from the control device and the butterfly valve 114 is moved for opening. In this case, the driving force of the stepper motor 115 is transmitted from the output shaft 115a through the stepper motor side spur gear 120 and the spur gear 122 to the worm 121, and the driving force is further transmitted from the worm 121 to the butterfly valve 114 through the worm wheel 114d. Thus, the opening movement of the butterfly valve 114 causes an opening movement to the main cooling water passage side valve body 114b while it causes a closing movement to the bypass cooling water passage side valve body 114c. When the main cooling water passage side valve body 114b is entirely opened and the bypass cooling water passage side valve body 114c is entirely closed, the cooling water does not flow to the bypass cooling water passage 113e in the main body 112, but it is fed from the radiator inlet passage 4 to the radiator 3 through only the main cooling water passage 113d, whereby the water is cooled.

When the temperature of the cooling water is lower than the set temperature, the stepper motor 115 is actuated by an instruction from the control device and the butterfly valve 114 is moved for closing. The closing operation of the butterfly valve 114 moves the main cooling water passage side valve body 114b toward the entirely closing side, and at the same time the cooling water passage side valve body 114c is moved toward the entirely opening side. In this state, the cooling water is not fed to the main cooling water passage 113d, but is fed to the radiator outlet passage 5 through the bypass cooling water passage 113e and the bypass passage 8. Thus, the temperature of the cooling water can be elevated while a suitable amount of the cooling water is circulated.

The cooling water temperature controlling apparatus 111 of the fifth embodiment of the present invention can perform not only the function of a thermostat by entirely closing or opening the butterfly valve 114 as described above but also the control of the flow rate of the cooling water at different and desired set temperatures depending on the various conditions of the engine. Further, the flow rate of the cooling water can be controlled by determining desirably the degree of opening of the butterfly valve 114. For instance, in a winter season in which the temperature of outer air is relatively low, the temperature of the cooling water can be raised by maintaining an intermediate degree of opening of the butterfly valve 114 and by adjusting the radiator inlet passage 4 in a direction of throttling. In a summer season in which the temperature of outer air is relatively high, the temperature of the cooling water can be maintained in a relatively low temperature by entirely opening the butterfly valve 114.

Thus, the cooling water temperature controlling apparatus 111 of the fifth embodiment of the present invention can control the flow rate of the cooling water to be fed to the radiator 3 by adjusting the degree of opening of the butterfly valve 114 by means of the stepper motor 115, depending on the temperature of the cooling water. Accordingly, the temperature of the cooling water can be always maintained at the optimum temperature. Further, since the main body 112 and the tubular member 113 form a kind of a branch joint, a conventionally used branch joint is no longer needed. Further, the provision of the bypass cooling water passage side valve body 114c in addition to the main cooling water passage side valve body 114b prohibits the cooling water from flowing to the bypass cooling water passage 113e in a case that the temperature of the cooling water becomes a set temperature or higher, whereby the entire amount of the cooling water can be fed to the radiator 3.

Since the butterfly valve 114 has the end at the side of the gear box 112d which is rotatably supported by the two ball bearings 116, 117 and has the opposite side end which is rotatably supported by the sleeve bearing 118, the butterfly valve can be certainly opened or closed even when the pressure of the cooling water and vibrations are applied to it.

In the fifth embodiment of the present invention, since the inner diameter of the axial hole 112e at the portion A between the gear box 112d and the first opening portion 112a is slightly smaller than the inner diameter of the other portions (i.e. the portion B between the first opening portion 112a and the second opening portion 112b and the portion C which is opposite the gear box 112d with respect to the second opening portion 112b), looseness between the axial hole 112e and the valve shaft 114a in the radial direction at the portion A is smaller than that of the portion B and portion C. Accordingly, only the portion A is required to have high accuracy in forming the axial hole 112b, and therefore, the machining of the axial hole can be easy. Further, the determination of the small diameter at the portion A increases the sealing function of the sealing member 119 and leakage of the lubricating oil such as grease in the gear box 112d can be minimized.

In accordance with the fifth embodiment of the cooling water temperature controlling apparatus of the present invention, the same effect as the before-mentioned embodiments can be obtained, and further the driving torque of the stepper motor can be effectively transmitted to the butterfly valve because of the provision of the ball bearings and the sleeve bearing to rotatably support the butterfly valve so as not to deflect the valve shaft in the radial direction.

Further, difficultly in operation of the butterfly valve resulted from the contact of the butterfly valve to the main body due to the pressure and vibrations caused when the cooling water flows, can be eliminated. The sleeve bearing which supports, with a gap larger than the gap between the valve shaft and the ball bearings, the end of the valve shaft at the bypass cooling water passage side functions to restrict the deflection of the valve shaft which extends through the main cooling water passage and the bypass cooling water passage in the main body. In normal use, the two ball bearings mainly support the valve shaft and the sleeve bearing does not adversely affect the support of the valve shaft.

A sixth embodiment of the cooling water temperature controlling apparatus of the present invention will be described with reference to FIGS. 9-12.

A reference numeral 211 designates a cooling water temperature controlling apparatus which comprises the main body 112, a butterfly valve 213 and a stepper motor 214.

Figure 9A:
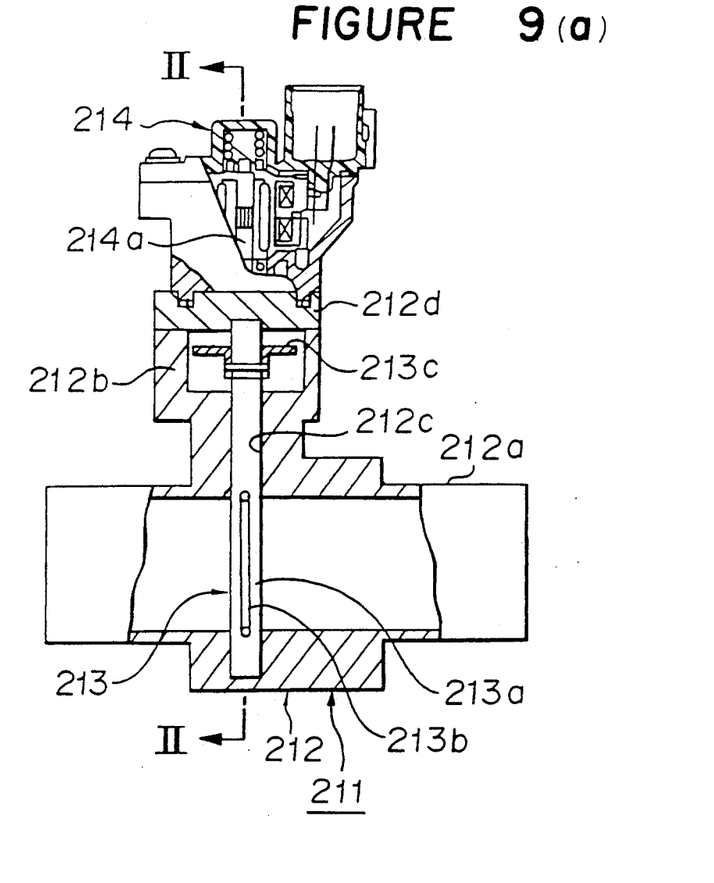
FIG. 9a is a front view partly broken of a sixth embodiment of the cooling water temperature controlling apparatus according to the present invention wherein a butterfly valve is entirely closed.
Figures 10, 11:
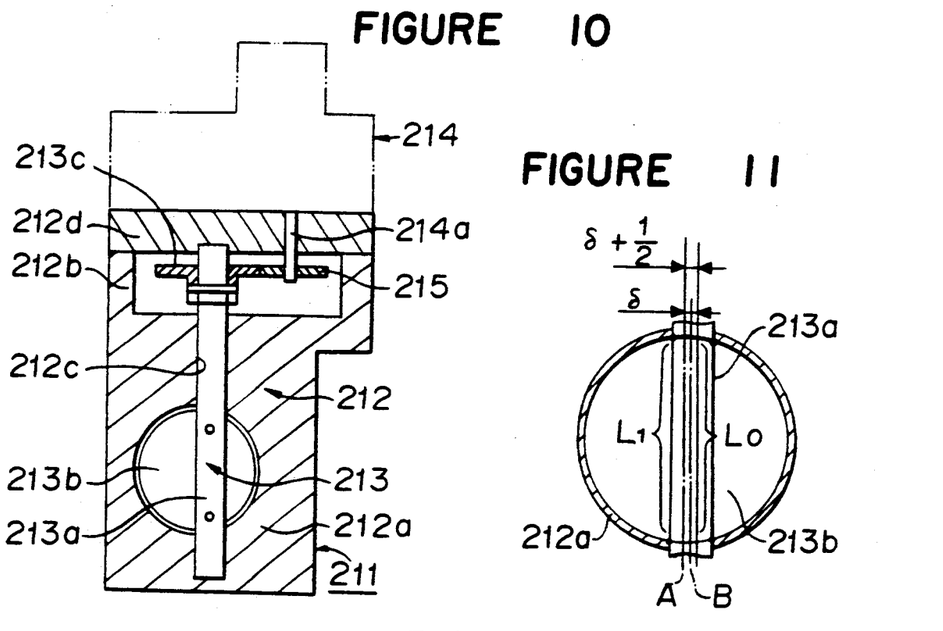

The main body 212 comprises a tubular portion 212a connectable to the radiator inlet passage 4 of the cooling apparatus to feed cooling water and a gear box 212b which is formed integrally with the tubular portion 212a and has a substantially rectangular hollow portion with a bottom. An axial hole 212c is formed extending in the tubular portion 212a and the gear box 212b, the axial hole 212c being adapted to receive a butterfly valve 213.

The butterfly valve 213 is to control the flow rate of the cooling water flowing in the tubular portion 212a. The butterfly valve 213 is constituted by a valve shaft 213a inserted in the axial hole 212c in the main body 212 so as to traverse the tubular portion 212a, and a valve body 213b fixed at the valve shaft 213a at the portion facing inside the tubular portion 212a, the butterfly valve 213 being rotatably supported in and by the main body 212. The valve shaft 213a has an end at the side of the gear box 212b, which is rotatably supported by a cover 212d fixed on the gear box 212b. A speed reducing spur gear 213c is fixed to the valve shaft 213a in the gear box 212b. The valve shaft 213a is attached to the valve body 213b at an eccentric position, i.e. a position outwardly shifted in the radial direction from the center of rotation of the valve body 213b. Namely, the center of the valve body 213b in the direction of its thickness is located at the axial center of the valve shaft 213a, however, the center of the valve body 213b in the radial direction is slightly offset to the axial center of the valve shaft 213a. The dimension of offset ($\delta$) is determined depending on the outer diameter of the valve shaft 213a, the thickness of the valve body 213b, the inner diameter of the tubular portion 212a which constitutes the cooling water passage and so on. Namely, in the sixth embodiment of the cooling water temperature controlling apparatus 211 of the present invention, a formula $L_0 \geq L_1$ is satisfied wherein $L_0$ represents the length of a chord which is offset by ($\delta + t/2$) from the center of the tubular portion 212a where t represents the thickness of the valve body 213b, and $L_1$ represents the length of the longer line among the tangent lines extending at the contacting point of the valve body 213b to the outer diameter of the valve shaft 213a, as shown in FIG. 11. In FIG. 11, one-dotted chain line A indicates the center of the cooling water passage and one-dotted chain line B indicates the axial center of the valve shaft 213a. Thus, by offsetting the valve shaft 213a from the valve body 213b, a pressure applied to one side of the valve body 213b by the cooling water flowing in the tubular portion 212a is different from a pressure applied to the other portion of the valve body 213b, and a torque is produced to turn the valve body 213b toward the direction of entirely opening. Namely, since the valve shaft 213a is brought to a freely rotatable condition, the valve body 213b is rendered to be an entirely opened state owing to the pressure of the cooling water.

The stepper motor 214 is to open and close the butterfly valve 213 and it is electrically connected to a sensor (not shown) which detects the temperature of the cooling water and a control device (not shown) so that the stepper motor is actuated depending on the temperature of the cooling water. The free end of the output shaft 214a of the stepper motor 214 passes through a cover 212d and extends in a gear box 212b. A stepper motor side spur gear 215 interlocked with a spur gear 213c which is firmly fixed to the valve shaft 213a of the butterfly valve 213 is fixed to the free end of the output shaft 214a. Namely, a speed reduction gear is formed by the stepper motor side spur gear 215 and the spur gear 213c. When the stepper motor 214 is actuated and the stepper motor side spur gear 215 is rotate along with the output shaft 214a, the spur gear 213c interlocked with the spur gear 215 is rotated at a reduced speed and the butterfly valve 213 is also driven.

Figure 12:
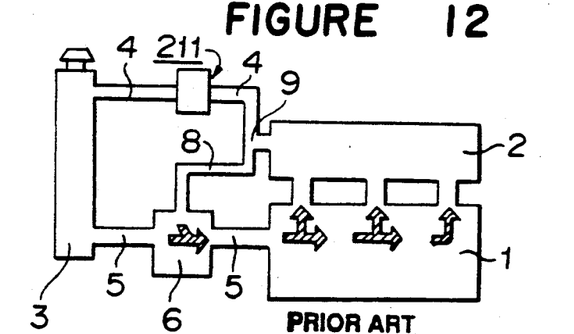
FIG. 12 is a diagram snowing a cooling apparatus in which the cooling water temperature controlling apparatus according to the sixth embodiment of the present invention is provided.

The cooling water temperature controlling apparatus 211 having the above-mentioned construction is connected to the cooling apparatus by connecting the tubular portion 212a of the main body 212 to the radiator inlet passage 4 instead of a conventionally used thermostat. In this case, either opening portion of the two portions in the tubular portion 212a may be the inlet of the cooling water.

When the temperature of the cooling water is higher than a set temperature value, the stepper motor 214 is actuated by an instruction from the control device so that the butterfly valve 213 is moved for opening. In this case, the driving force of the stepper motor 214 is transmitted from the output shaft 214a through the stepper motor side spur gear 215 and the spur gear 213c to the butterfly valve 213. The opening movement of the butterfly valve 213 allows the cooling water to flow to the radiator 3 through the radiator inlet passage 4, whereby the cooling water is cooled.

When the temperature of the cooling water is lower than the set temperature, the stepper motor 214 is actuated by the control device so that the butterfly valve 213 is moved for closing. The closing movement of the butterfly valve 213 prohibits the cooling water from flowing to the radiator 3, and it is fed to the radiator outlet passage 5 through the bypass passage 8.

Figure 9B:
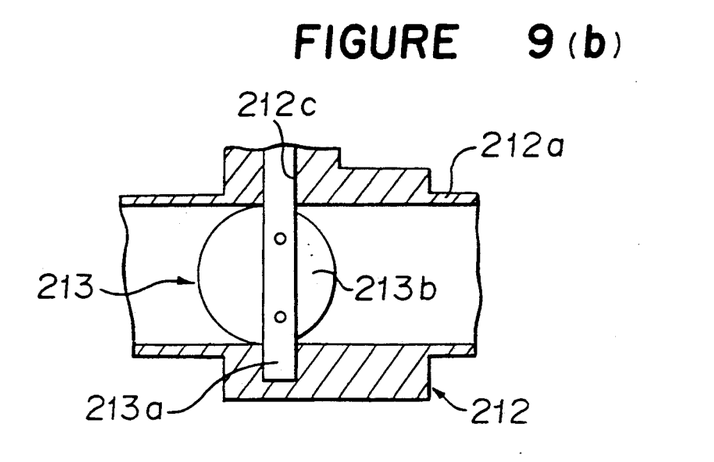
FIG. 9b is an enlarged cross-section view of the controlling apparatus wherein the butterfly valve is entirely opened.

The cooling water temperature controlling apparatus 211 according to the sixth embodiment of the present invention can perform not only function as a thermostat by entirely closing or opening the butterfly valve 213, but also can control the flow rate of the cooling water at different and desired temperatures depending on various conditions of the engine. Further, the controlling apparatus 211 can control the flow rate by determining optionally the degree of opening of the butterfly valve. For instance, in a winter season in which the temperature of outer air is relatively low, the temperature of the cooling water can be brought to a higher level by maintaining an intermediate degree of opening of the butterfly valve 213 and by throttlling the radiator inlet passage 4. In a summer season in which the temperature of outer air is relatively high, the temperature of the cooling water can be maintained at a lower temperature level by entirely opening the butterfly valve 213.

Thus, by adjusting the degree of opening of the butterfly valve 213 by means of the stepper motor 214, the flow rate of the cooling water to be fed to the radiator 3 can be controlled depending on the temperature of the cooling water. Therefore, the temperature of the cooling water can be always maintained at a suitable temperature level.

If there causes a problem that a power source for the stepper motor 214 becomes faulty or the coil of the stepper motor 214 is broken so that the torque becomes too small to enable the butterfly valve to entirely open, a torque is produced to rotate the valve body 213b toward the entirely opening direction because the valve shaft 213a is attached to the valve body 213b at an offset position. Accordingly, the torque of the stepper motor 214 apparently becomes large, whereby the butterfly valve 213 is entirely opened.

In the sixth embodiment of the present invention, description is made as to a case that the reduction gear comprising the spur gears 215 and 213c is installed between the stepper motor 214 and the butterfly valve 213. However, the present invention is not limited to the above-mentioned embodiment, but a reduction gear using, for instance, bevel gears may be used.

Thus, in accordance with the sixth embodiment of the cooling water temperature controlling apparatus of the present invention, the flow rate of the cooling water to be fed to the radiator can be controlled depending on the temperature of the cooling water by adjusting the degree of opening of the butterfly valve by means of the stepper motor. Accordingly, the temperature of the cooling water can be always maintained at the optimum temperature regardless of outer temperature conditions. Specifically, in a winter season, the performance of a heater is increased and fuel cost ca be improved by controlling the temperature of the cooling water at a higher temperature level, while in a summer season, reduction of cooling effect to the engine and increase the temperature of lubricating oil can be prevented by controlling the temperature of the cooling water to be a lower level.

The cooling water temperature controlling apparatus can be formed as a single control valve. Accordingly, it is unnecessary to use a large-sized cooling water flowing system.

The employment of the butterfly valve in order to control the flow rate of the cooling water reduces a pressure loss in the cooling water passage. The pressure loss is caused by a projection of the thickness of the valve shaft and the valve body. Further, the use of the butterfly valve allows a smooth flow of the cooling water unlike a case that a conventional thermostat is used because there is no rapid change of the flowing direction of the cooling water. Accordingly, the pressure loss in the cooling water passage of the cooling water can be drastically reduced and a large amount of the cooling water can be fed.

Further, the controlling apparatus of the sixth embodiment of the present invention operates the butterfly valve to be entirely opened by the pressure of the cooling water applied to the butterfly valve when a power source for the stepper motor is interrupted or the stepper motor becomes faulty. Accordingly, even when the stepper motor becomes inoperable in a case that the butterfly valve is in a closing state, a disadvantage that the cooling water is prohibited by the butterfly valve from flowing the radiator and the engine and lubricating oil are not cooled, can be certainly prevented to thereby improve reliability.

Obviously, numerous modifications and variations of the present invention are possible in light of the above teachings. It is therefore to be understood that within the scope of the appended claims, the invention may be practiced otherwise than as specifically described herein.

What is claimed is:

1. A cooling water temperature controlling apparatus for an internal combustion engine having a cooling system including a cooling water passage through which the water is fed to a radiator, and a bypass passage connected to said cooling water passage at a bypass point which bypasses said radiator, said apparatus comprising:

a butterfly valve placed in said cooling water passage for the internal combustion engine at a position downstream of said bypass point, and a stepper motor connected to the butterfly valve through a reduction gear in a gear box housing and having a worm gear wheel so as to adjust a degree of opening of the butterfly valve depending on the temperature of cooling water so as to correspondingly control the flow of water through said radiator based on the temperature thereof, wherein a spring member is connected at one end thereof to the gear box housing and at the other end thereof to said worm wheel for driving the butterfly valve so as to force the valve body of the butterfly valve in the direction of opening.

2. The apparatus of claim 1 wherein the valve rod of the butterfly valve is eccentrically provided in the radially outer direction with respect to the center of rotation of th valve body.

3. A cooling water temperature controlling apparatus for an internal combustion engine which comprises:

a main body having a main cooling water passage and a bypass cooling water passage branched from the main cooling water passage, a butterfly valve for regulating a flow rate of cooling water which is to open and close the main cooling water passage, and a stepper motor connected to the butterfly valve through a reduction gear having a worm gear wheel, wherein the branch portion for branching the bypass cooling water passage from the main cooling water passage is formed at the upstream side of the butterfly valve;

wherein a second butterfly valve is placed in the bypass cooling water passage so that the angle of the second butterfly valve is perpendicular, in the direction of opening or closing, to that of the first butterfly valve which is placed in the main cooling water passage, and the second butterfly valve is opened and closed in accordance with the movement of opening and closing of the first butterfly valve.

4. A cooling water temperature controlling apparatus for an internal combustion engine which comprises:

a main body having a main cooling water passage and a bypass cooling water passage branched from the main cooling water passage, a butterfly valve having a valve rod which is rotatably supported by the main body and extends in the main cooling water passage and the bypass cooling water passage at the downstream side of the branch portion of the both passages, said butterfly valve having two valve bodies attached to the valve rod in said both cooling passages wherein the angle of one valve body is perpendicular to the angle of the other valve body in the direction of opening or closing, and a stepper motor connected through a reduction gear having a worm gear wheel to the butterfly valve at a side of the main body, wherein the valve rod is on one hand supported at the side of the reduction gear by two ball bearings which are disposed at both sides of the connecting portion of the reduction gear, and the valve rod is on the other hand supported at the side of the bypass cooling water passage by a sleeve bearing which has a greater gap to the valve rod than the gap of the ball bearing to the valve rod.

5. The cooling water temperature controlling apparatus according to claim 4, wherein the bypass cooling water passage is formed below and in parallel to the main cooling water passage in the main body.

* * * * *